US006971971B2

(12) United States Patent
Duskunovic et al.

(10) Patent No.: US 6,971,971 B2
(45) Date of Patent: Dec. 6, 2005

(54) METHOD AND SYSTEM FOR AN ADAPTATION OF AN ENGAGEMENT OF AN AUTOMATED CLUTCH

(75) Inventors: Ivana Duskunovic, Gent (BE); Dries T'Hooft, Sijsele-Damme (BE); Kris Vanstechelman, Bruges (BE)

(73) Assignee: Spicer Off-Highway Belgium N.V., Bruges (BE)

( * ) Notice: Subject to any disclaimer, the term of this patent is extended or adjusted under 35 U.S.C. 154(b) by 0 days.

(21) Appl. No.: 11/118,012

(22) Filed: Apr. 29, 2005

(65) Prior Publication Data

US 2005/0192155 A1    Sep. 1, 2005

Related U.S. Application Data

(63) Continuation of application No. PCT/EP03/12253, filed on Nov. 3, 2003.

(30) Foreign Application Priority Data

Nov. 1, 2002  (DE) ................................. 102 51 428

(51) Int. Cl.$^7$ ............................................ B60K 41/22
(52) U.S. Cl. ......................... 477/175; 477/80; 477/86; 477/156; 477/169
(58) Field of Search .............................. 477/79, 80, 86, 477/156, 158, 159, 169, 174, 175

(56) References Cited

U.S. PATENT DOCUMENTS

| | | | | | |
|---|---|---|---|---|---|
| 4,730,708 | A | * | 3/1988 | Hamano et al. | 477/114 |
| 5,535,863 | A | * | 7/1996 | Vukovich et al. | 192/3.3 |
| 6,085,136 | A | * | 7/2000 | Katakura et al. | 701/51 |
| 6,086,513 | A | * | 7/2000 | Tominaga | 477/169 |
| 6,217,481 | B1 | * | 4/2001 | Watanabe et al. | 477/169 |

FOREIGN PATENT DOCUMENTS

| | | | | |
|---|---|---|---|---|
| JP | 64-35172 | * | 2/1989 | 477/156 |
| JP | 03-260467 | * | 11/1991 | 477/169 |

* cited by examiner

Primary Examiner—Ha Ho
(74) Attorney, Agent, or Firm—Marshall & Melhorn LLC.

(57) ABSTRACT

A clutch is operated by an actuating pressure pressure during an engaging process of the clutch. The actuating pressure is controlled over time such that predetermined characteristics for an engagement of said clutch are approximated by starting a process for changing a rotational speed of an output shaft of the torque converter for an adaptation of the rotational speed to an actual velocity of the vehicle during engagement of the clutch. An ideal signal for the rotational speed is determined which corresponds to an estimate for an engagement of the clutch with the predetermined characteristics. An actual signal of the rotational speed of the output shaft over time is measured during said process. Deviations are determined between the actual signal and the ideal signal. Finally the signal of the actuating pressure over time is automatically changed in order to reduce the deviations between the actual signal and the ideal signal if the deviations exceed a threshold.

20 Claims, 2 Drawing Sheets

METHOD AND SYSTEM FOR AN ADAPTATION OF AN ENGAGEMENT OF AN AUTOMATED CLUTCH

CROSS REFERENCE TO RELATED APPLICATIONS

This application is a continuation of International Patent Application PCT/EP2003/12253 filed Nov. 3, 2003, entitled "Verfahren und System zur Adaptierung einer automatischen Kupplung" and claiming priority to co-pending German Patent Application No. DE 102 51 428.3 filed Nov. 1, 2002 and entitled "Verfahren und System zur Adaptierung einer automatischen Kupplung".

FIELD OF THE INVENTION

The invention relates to a method and a system for adaptation of engaging an automated clutch which is arranged downstream of a torque converter in a transmission system of a vehicle, in particular in a transmission system which is shiftable under load. The clutch is actuated by an actuating pressure during engagement of the clutch. The signal of the actuating pressure over time is controlled such that the process of engaging the clutch follows predetermined characteristics.

BACKGROUND OF THE INVENTION

The scope of the control of an automated clutch is a "soft" characteristic during engagement such that differences in the rotational speeds of the shafts connected to the different parts of the clutch are smoothed out without any jerks and jolts and without non-smooth transitions. This is not only the case for clutches used during startup or for a change of the driving direction of the vehicle but also for all clutches involved with changing a gear of a transmission system, in particular a transmission system shifted under load. The process of engaging an automated clutch is controlled by means of the actuating pressure acting upon the clutch. The actuating pressure causes the movement of the discs of the clutch versus each other and presses the discs against each other if a so called kiss-point of the clutch is reached. It is well known that in the beginning in a so called "filling phase" a relatively large actuating pressure of the clutch is useful in order to decrease the distance of the discs of the clutch within a short time interval. During a subsequent so called "modulation phase" the actuating pressure of the clutch increases from a lower level. In a controlled manner the contact friction between the discs of the clutch is increased such that existing differences in the rotational speeds of the shafts connected to the clutch are evened out. The signal of the actuating pressure of the clutch determines the signal or course of the adaptation of the rotational speeds of the two aforementioned shafts. In order to receive an engaging process with predetermined characteristics the signal or course of the actuating pressure of the clutch has to be tuned.

Also in series production of vehicles of the same type it has been observed that an individual and careful adaptation of the signal of the actuating pressure of the clutch is useful or necessary for every clutch of the "population" of transmission systems in order to provide for a soft engaging process without non-smooth transitions. However, even if an adaptation of the signal of the actuating pressure of the clutch has taken place in the beginning of the lifetime of the vehicle so that an engaging process with a predetermined characteristic is guaranteed, in a lot of cases these predetermined characteristics will not be fulfilled after some time. This is due to wear of the clutch and other parts of the vehicle which results in a different reaction of the clutch for an unchanged signal of the actuating pressure of the clutch over time.

Another problem involved with the adaptation of an optimal signal of the actuating pressure of the clutch is that according to common methods subjective criteria have been used for the adaptation process. This means that the signal of the actuating pressure of the clutch over time is changed until the individual performing the adaptation process is of the subjective opinion that an engagement process with his desired predetermined characteristics is performed. The individual feeling whether the engaging process has been smooth and without any jerks differs from one person to another. An automation of the adaptation of the signal of the actuating pressure of the clutch is not possible on the basis of the criterion of the individual feeling of a testing person. However, an automated adaptation of a clutch of a specific vehicle and its actual operating state would be desirable.

Accordingly, it is one objective of the present invention to provide a method and a system for performing an adaptation of a clutch with respect to the signal of the actuating pressure of the clutch over time in an automated manner. Another objective of the invention is to perform the aforementioned adaptation process in a simple manner for a new specific vehicle as well as throughout the lifecycle of the vehicle.

SUMMARY OF THE INVENTION

The present invention uses an objective criterion which is independent from the individual feeling of a testing person. The criterion describes whether an engaging process of the specific clutch is performed with predetermined characteristics or not. For that purpose the clutch is tested under defined conditions. These defined conditions are set by a process which is chosen with the condition that the rotational speed of an output shaft of a torque converter which is located upstream of the clutch changes during engagement of the clutch. Such a change occurs if the rotational speed of the output shaft starts to adapt with the actual speed of the vehicle. Accordingly, throughout the engaging process the adaptation process of the output shaft of the torque converter which in the beginning does not fit the rotational speed, adapts to the basically constant rotational speed of the output shaft of the transmission system. Throughout such an adaptation process the clutch has to overcome moments of inertia of the output shaft and other rotated transmission parts as well as torsional moments of the torque converter by means of friction between the discs of the clutch. In case that the adaptation process of the rotational speed of the output shaft of the torque converter is smooth and without any jerks throughout the engaging process, it is assumed that the engaging process has taken place with the aforementioned predetermined characteristics. In order to perform an automated control, according to the invention the elected and started process an ideal signal of the rotational speed of the output shaft is predetermined over time which correlates with an estimate for an engaging process with predetermined characteristics. Such an ideal signal is an objective definition of the signal of the rotational speed of the output shaft of the torque converter at any time during the process. This ideal signal is compared with a measured actual signal of the rotational speed of the output shaft with the scope to determine any deviations. In case that no deviations are observed, the chosen signal of the actuating pressure over time has been optimal. Otherwise, if deviations are observed, it will be checked if a predetermined threshold or limit value is exceeded which can be used as an indicator that a change of the actuating pressure of the clutch is necessary in order to reduce the deviations within tolerable limits. If this is the case the signal of the actuating pressure over time is automatically changed. For determining the needed amount and time behavior of the change the observed deviations of the measured actual signal of the rotational speed of the output shaft from the ideal signal are used. For the whole process after the start of the adaptation no external intervention is necessary. The whole process is performed automatically. However, also semi-automatic embodiments can be used wherein the driver of the vehicle starts the process, so that only the subsequent steps of the method according to the invention are performed automatically.

The process the adaptation relies on and during which the rotational speed of the output shaft of the torque converter is changed for an adaptation to the actual speed of the vehicle during engagement of the clutch may be used for the following conditions: engagement of the clutch for resting vehicle, running engine and blocked wheels. During that process the rotational speed of the output shaft of the torque converter during engagement changes from the current rotational speed to zero in order to adapt to the velocity of zero of the vehicle. In particular this specific process is used, if the clutch of a new vehicle has to be adapted for the first time or a new adaptation becomes necessary due to maintenance, service or repair of the vehicle.

On the other hand, it is also possible that the adaptation process is not performed for resting but for moving vehicle. For that purpose a process can be chosen during which the driver of the vehicle shifts down so that for reengagement of the clutch the rotational speed of the output shaft of the torque converter has to be increased for an adaptation to the actual speed of the vehicle and to the changed transmission ratio of the transmission system.

According to another embodiment of the invention throughout the process underlying the adaptation the rotational speed of the input shaft of the torque converter is held constant. Also the velocity of the vehicle is approximately constant during the process so that the process is performed under defined conditions. For that purpose it can be helpful not to change the settings of the torque converter throughout the process.

According to the invention it is preferred to describe and determine the ideal signal of the rotational speed of the output shaft by means of at least one mathematical function such that the use and implementation of the ideal signal of the rotational speed is simplified. A mathematical function can be parameterized and described in a very simple manner and is easier to store than a point-by-point-definition of the ideal signal. However, also the use of a point-by-point-definition of the ideal signal of the rotational speed of the output shaft without the use of a mathematical relationship between the points is possible.

Furthermore the ideal signal of the rotational speed of the output shaft may be described by an exponential function. However, according to another embodiment of the invention the ideal signal of the rotational speed of the output shaft is described by a Gaussian function. The bell-like shape of a Gaussian function whose width correlates with the overall time of the engaging process approximates quite close a smooth engagement of the clutch without any jerks. The ideal signal of the rotational speed of the output shaft could alternatively be described by so called Weibull functions (www.weibull.com).

On the other hand, in practical applications it has been proven that for an adaptation of a clutch according to the inventive method it could be sufficient to describe the ideal signal of the rotational speed of the output shaft for the comparison with the actual signal by means of one single linear function. Due to the steady slope of the actual signal of the rotational speed of the output shaft such a linear function is sufficient as a criterion for the quality of the actual process. This is in particular the case if besides the geometrical deviation of the actual signal from the ideal signal additional criteria are used for the evaluation of the actual signal of the rotational speed of the output shaft. Besides others these additional criteria could be the observation of the missing of an undesired change of the direction of the change of the rotational speed or the derivative of the rotational speed or the missing of undesired jumps of the rotational speed.

The ideal signal of the rotational speed of the output shaft over time according to the invention may be chosen such that it is suitable for the actual absolute change of the rotational speed during the process underlying the adaptation. For that purpose the ideal signal of the rotational speed of the output shaft is initially fixed independent on the actual absolute change of the rotational speed. In the following the ideal signal is scaled to the actual absolute change of the rotational speed during the process for the comparison with the actual signal.

In some cases it may occur that the adaptation of the clutch according to the invention cannot be performed within one single step of change. For a control of the result of the adaptation process it may be useful to repeat the process underlying the adaptation after the automatic change of the signal of the actuating pressure over time, so that the adaptation result is "reviewed". Further iterations can be useful as long as the review yields the results that the remaining deviations between the actual signal and the ideal signal of the rotational speed of the output shaft of the torque converter exceed a predetermined threshold or limit value.

As a measure for the deviations of the actual signal of the rotational speed of the output shaft over time and the ideal signal the "square distance" of the two aforementioned signals can be used. The square distance reacts stronger to large differences in the rotational speeds for short periods than for smaller differences in the rotational speeds occurring for longer periods. The criterion of the square distance is a well proved criterion for comparing curves or signals which is also appropriate as a control signal for the automatic adaptation of the actual signal to the ideal signal of the rotational speed of the output shaft of the torque converter.

A practical implementation of the method of the square distance of the signals may be given by calculating the sum of the square distances of the rotational speeds at different distinct times. Other applicable criteria to determine the deviation of the two signals that could be used for the present invention are the sum of the absolute distances of the two rotational speeds at distinct times, the sum of the square of the normal distances or also the sum of the absolute normal distances.

Further criteria are known from a person with ordinary skill in the art.

As mentioned before, additional criteria for the quality of the evaluation of the actual signals of the rotational speed of the output shaft can be considered. According to one embodiment this may comprise increasing the value of a deviation from the ideal signal if the change of the rotational speed of the output shaft comprises an undesired change of the direction or undesired jumps.

The basic adaptation of the actual signal of the rotational speed of the output shaft of the torque converter to the ideal signal will usually be an iterative process wherein the signal of the actuating pressure of the clutch over time is changed in small steps or in steps with decreasing size until the deviations do not exceed a limit value or threshold. The approximation of the optimal signal of the actuating pressure of the clutch may be accelerated by performing the changes under consideration of past experiences with respect to a reaction of the signal of the rotational speed of the output shaft of the torque converter upon past changes. These test experiences can be used in the form of mathematical functions of the deviations of the actual signal from the ideal signal of the rotational speed of the output shaft of the torque converter or also in the form of a table, map or chart.

If the signal of the actuating pressure of the clutch is changed such that the actual signal of the rotational speed of the output shaft of the torque converter of the process underlying the adaptation approximates the ideal signal to a sufficient extent the changed signal of the actuating pressure of the clutch over time is stored and is used for engaging the clutch as long as the adaptation has to be repeated. The repetition of the adaptation process may also be triggered after a predetermined runtime of the vehicle in an automated manner.

According to the invention the adaptation may be performed for each clutch of the transmission system of a specific vehicle. This can be done by only observing the rotational speed of the same output shaft of the torque converter. The signals of the actuating pressure of the clutch over time have to be adjusted for every clutch and have to be stored.

The means required for a system for performing the adaptation process according to the invention may—besides a measuring device for the rotational speed of the output shaft of the torque converter, which is usually provided in a modern vehicle—be concentrated in a CPU of the vehicle which exists in the vehicle also for other purposes. In the CPU the signal of the actuating pressure of the clutch over time can be stored and changed.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
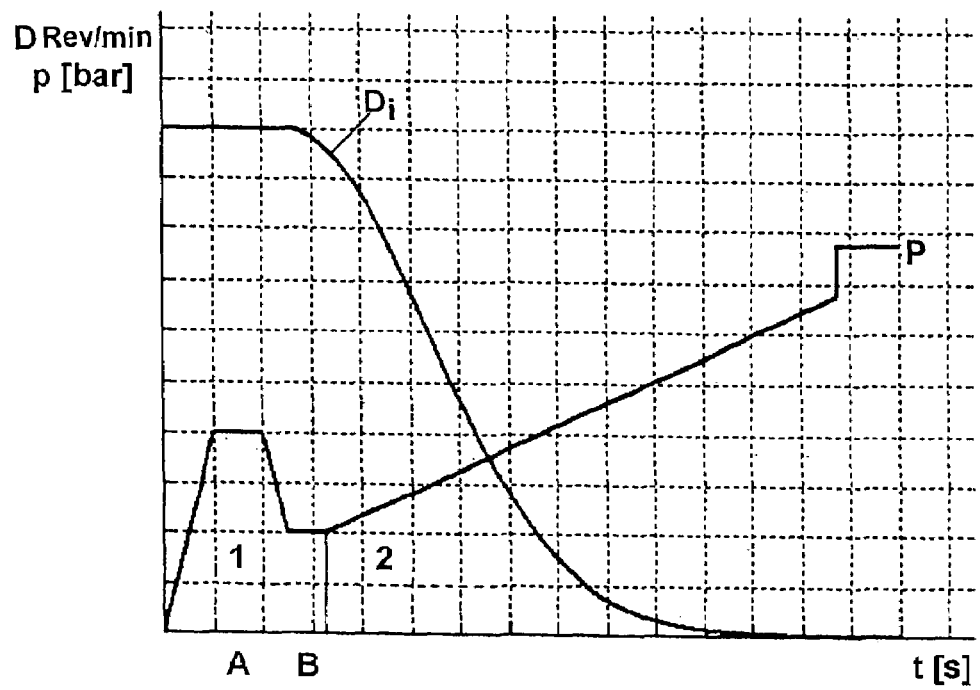
FIG. 1 shows a signal of an activating pressure of a clutch and an ideal signal of the rotational speed of an output shaft of a torque converter, which is connected with the clutch, over time during engagement of the clutch.

In a transmission system, in particular a transmission system which is shiftable under load, an output shaft of a torque converter of a vehicle is located upstream of the transmission system. The clutch can be a clutch which is responsible for a change of the driving direction. FIG. 1 shows the signal of the activating pressure p of the clutch over time during the engaging process. Discs of the clutch will be subjected to the activating pressure p throughout the engaging process. During a "filling phase" 1 the discs of the clutch will be moved towards each other due to the actuating pressure p. In a subsequent "modulation phase" 2 the discs of the clutch will be pressed against each other in order to increase friction between the discs. By means of the signal of the activating pressure p over time the characteristics of an engaging process of the clutch will be controlled. The optimal engaging process is a smooth engaging process without any jerks. During such an optimal engaging process the different rotational speeds of two shafts connected to the clutch are equalized in a steady manner. Additionally, the equalization starts as carefully as it ends. Exemplary FIG. 1 shows the engaging process with the ideal signal of the rotational speed $D_i$ of the output shaft arranged upstream of the clutch of the torque converter over time during a process wherein the clutch is engaged for resting vehicle with blocked wheels and running engine such that the rotational speed $D_i$ is lowered to zero during engaging of the clutch. This lowering comprises a smooth start in the end of the filling phase 1 and finishes smooth when the rotational speed reaches zero velocity. The signal of the rotational speed $D_i$ over time approximates or equalizes the right half of a Gaussian function which is scaled to the amount of the absolute decrease of the rotational speed over the engaging process and to the duration of the engaging process.

Figure 2:
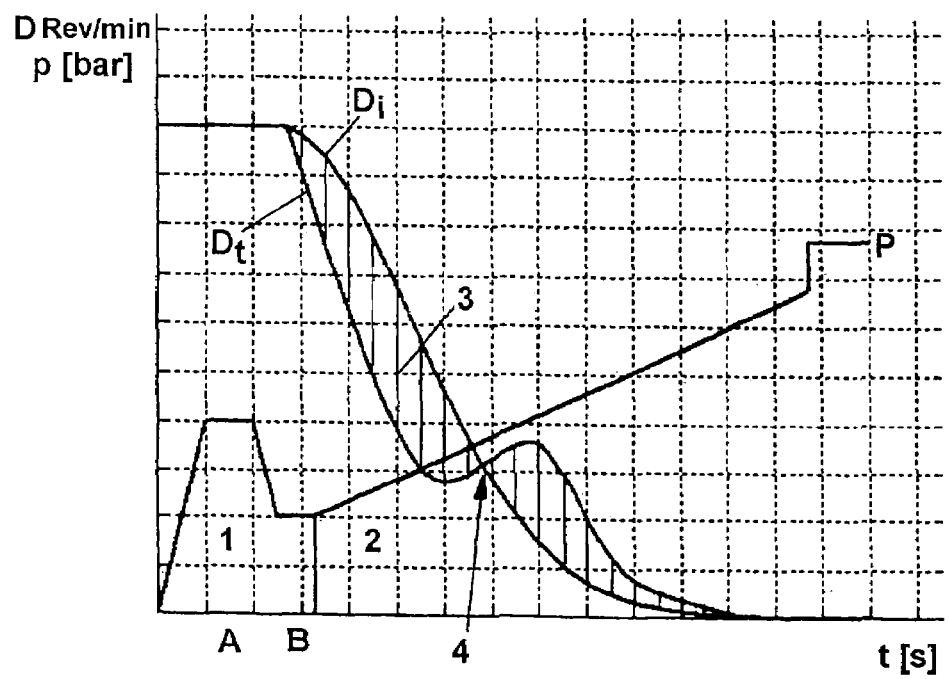
FIG. 2 shows additionally to the signals according to FIG. 1 an actual signal of the rotational speed of the output shaft over time during engagement of the clutch which differs from the ideal signal.

FIG. 2 shows additionally to the signals shown in FIG. 1 the actual signal of the rotational speed $D_t$ of the output shaft of the torque converter over time. The actual signal is the actual result of the activating pressure p of the clutch during the above defined engaging process. Due to the fact that the decrease of the rotational speed is stronger than that of the ideal signal the actual signal deviates from the ideal signal of the rotational speed $D_i$ already in the beginning of the modulation phase 2. A remarkable, significant deviation of the signals of the rotational speeds $D_t$ and $D_i$ is given in the time range 4, wherein the actual signal of the rotational speed $D_t$ comprises a positive slope which is not tolerable for an optimal engaging process. On the basis of these deviations between the signals of the rotational speeds $D_i$ and $D_t$ the activating pressure p has to be changed such that the actual signal of the rotational speed $D_t$ of the output shaft of the torque converter approximates the ideal signal of the rotational speed $D_i$. Concurrently the positive slope of the rotational speed $D_t$ in the time range 4 should disappear. As a measure for the deviation the difference 3 determined at distinct time levels between the rotational speeds $D_i$ and $D_t$ may be used. Preferably, the sum of the squares of the differences 3 is used which correlates with the square distance of the signals of $D_i$ and $D_t$. If the sum does not exceed a predetermined limit value or threshold, the actual signal of the rotational speed $D_t$ is sufficiently close to the ideal signal of the rotational speed $D_i$. Additionally, the signal of the rotational speed $D_t$ can be checked and adapted on the basis of the criterion that the signal has a steady negative slope in order to avoid a positive slope and to avoid an increase of the rotational speed of the output shaft of the torque converter in time as depicted in time range 4.

In further detail the filling phase 1 is characterized by the following main characteristics. The clutch has to be filled in a fast manner by a hydraulic fluid in order to move the pistons acting upon the discs of the clutch in a fast manner so that the main engaging process leading to a contact of the discs can be started without unnecessary delays. The progress of the filling phase 1 is defined by the progress of filling the clutch with the hydraulic fluid. The progress of filling is proportional to the area under the curve of the activating pressure p of the clutch in FIG. 1. During the filling phase 1 the clutch does not transmit any torsional moment. At the point where the clutch starts to transmit a torsional moment the filling phase 1 is finished and the modulation phase 2 starts. The filling phase 1 consists of two phases A and B. During phase A the maximum flow of hydraulic fluid to the clutch occurs. Phase A comprises the steep part with positive slope according to FIG. 1, the first plateau and the first decrease of the activating pressure p of the clutch. During phase A the clutch should be filled with hydraulic fluid as fast as possible. This phase is followed by the stabilizing phase B wherein the activating pressure p of the clutch is stabilized to a value which is necessary for a soft start of the modulation phase 2 correlating with a smooth engaging process. The course of the curve of the activating pressure p of the clutch, so the course of the area under the aforementioned curve, i.e. the filling of the clutch, over time can be controlled by means of different parameters by the control unit of the transmission system which is known by a person with ordinary skill in the art.

The main feature of the modulation phase 2 is a continuous increase of pressure behind the pistons acting upon the discs of the clutch. The pressure usually increases approximately linear with time. Alternatively, the pressure is varied by means of different segments each per se being linear so that every possible form of an increase of pressure can be provided throughout the modulation phase 2. Possibilities for modifications are given by means of different parameters in the control of the clutch of a transmission system and are known from the persons with ordinary skill in the art.

It is common to control the signal of the activating pressure of the clutch by means of control valves in the form of magnetic control valves. The control valves adjust the activating pressure of the clutch for a suitable activation of the clutch with a hydraulic fluid. Common magnetic valves for a control of clutches provide zero pressure in case of maximum current flowing through the magnetic coil, whereas zero current correlates with maximum pressure. The dependence of the actual pressure at the outlet of the magnetic valve from the current through the magnetic coil will be considered automatically during the control of the magnetic valve by means of a microcontroller of the magnetic valve. A person with ordinary skill in the art will know the interrelation between the current flowing through the magnetic coil of a used magnetic valve and the activating pressure of the clutch. For the present invention it is sufficient to investigate the activating pressure of the clutch which is acting upon the clutch.

An implementation of the new method for an adaptation of an automated clutch has the scope to provide for a soft engaging process. In this context the clutch can be a clutch being responsible for a change of the driving direction, a change of a drive mode or a change of a gear. A soft engaging process is necessary to avoid jerks occurring during the travel of the vehicle. This can be explained by means of a forklift-vehicle carrying an unstable load. If the forklift-vehicle uses an automatic shift control, it is extremely important to perform soft shifting processes because the driver is not able to predict the times where a shift occurs. If a load has to be carried the change of the driving direction is a very critical state. According to this observation the present invention can be applied to each and every type of machine which requires a soft engagement of a clutch.

In order to perform the adaptation according to the present invention, the system has to fulfill specific requirements. One basic requirement is that the rotational speed of the output shaft of the torque converter is determined. The aforementioned rotational speed is used for an adaptive control of the specific clutch. The rotational speed of the input shaft of the torque converter must be held to a defined value, i.e. an engine driving the torque converter should be held at constant speed. The control unit for the adaptation process may comprise a specific control loop for that purpose.

Furthermore, the hydraulic circuit of the adaptive control unit must be defined such that the adaptive control is configured and designed to adjust a specific activating pressure of the clutch by means of a control of a magnetic valve at a specific time. Besides the properties of the magnetic valve also the temperature of the fluid in the hydraulic circuit is of importance. This is due to the fact that the temperature of the fluid influences the viscosity of the fluid. According to one embodiment the adaptive control or a microcontroller of the magnetic valve considers the temperature of the fluid.

Figure 3:
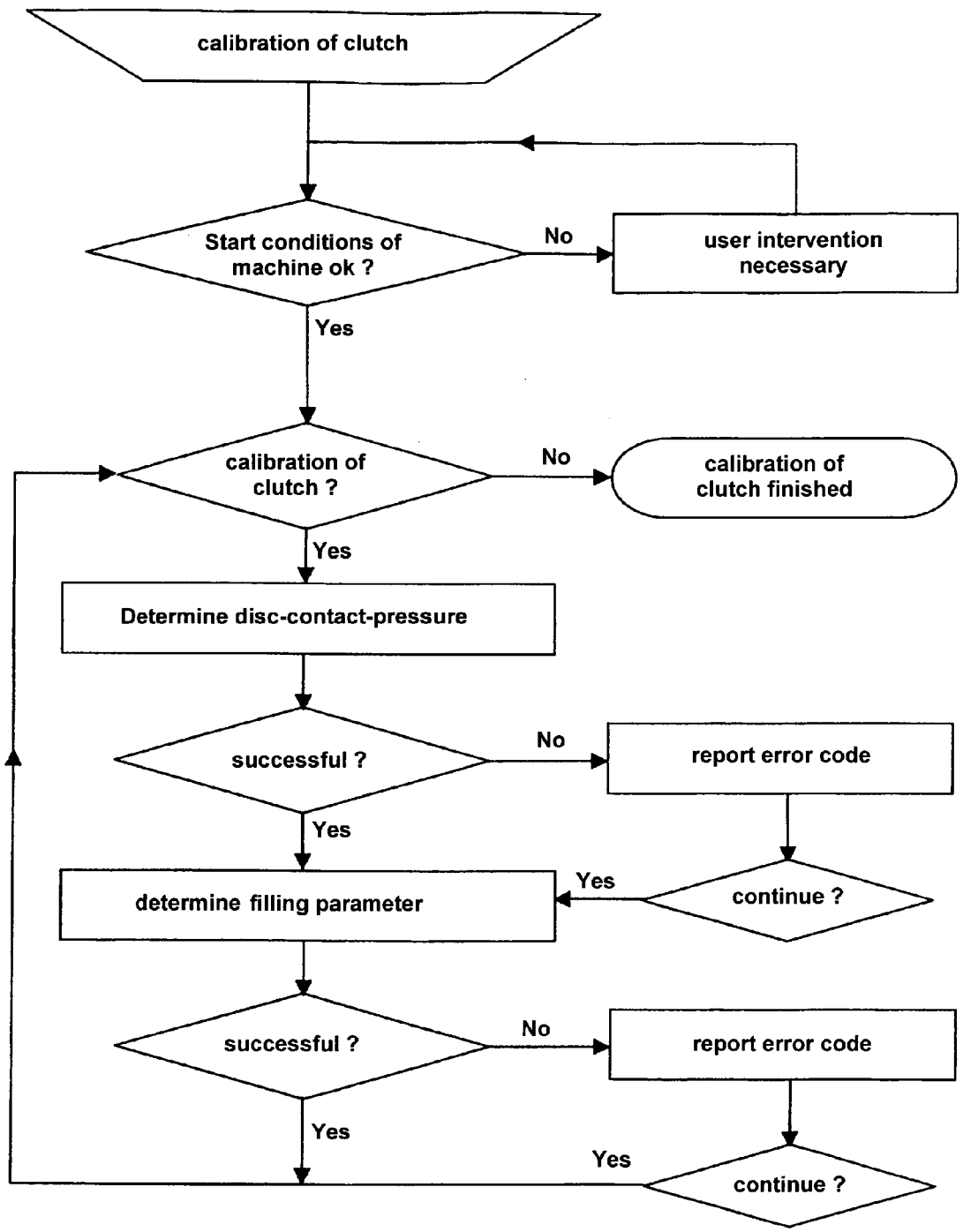
FIG. 3 shows a flow chart for an implementation of the method according to the invention.

In the beginning of a concrete adaptation and calibration process of the clutch according to FIG. 3 a number of starting conditions of the machine is checked. The rotational speed of the engine, i.e. the rotational speed of the input shaft of the torque converter, must be stable within a given range. This range can be programmable within the control. The limits of this range depend on the type of transmission system and on the use of the vehicle. Additionally the temperature of the transmission system must be within a specific range. Also this range can be programmable in the control unit and may depend on the type of transmission system used and on the use of the vehicle. If the vehicle should rest, the parking brake of the vehicle should be actuated. The control unit should receive a signal indicating that the parking brake is activated. The shift lever should be in neutral position. Only if all of the necessary initial conditions of the machine are given, on request the iterating process of adaptation will be started in order to determine the parameters that define the filling process of each clutch and that result in shifts with the desired soft engaging behavior.

Besides a check of the initial conditions of the machine in the beginning of the adaptation of the clutch also later control of the compliance of these conditions might be possible. If any of the initial conditions of the machine are not fulfilled for longer periods, the adaptation process may be stopped automatically. This could for example be the case if the temperature of the gear box increases out of the given range or if the rotational speed of the engine drops down out of the specific range.

The flow chart according to FIG. 3 shows a main loop which is performed for each of the clutches being calibrated. The main loop comprises two processes in which the pressure correlating with the kiss-point of the clutch and the filling parameters will be determined. In the following these two processes will be explained in further detail.

The pressure correlating with the kiss-point of the clutch is a good indicator of the beginning of the stabilizing phase B of the filing phase 1 according to FIG. 1. For that reason in the beginning of the method the pressure correlating with the kiss point of the clutch is determined. For that purpose, the clutch is filled in an accelerated manner in order to provide for every conduit from the control valve to the clutch being freshly filled with fluid. After a short stabilizing phase, mainly in order to provide for a stabilization of the rotational speed of the output of the torque converter, the activating pressure of the clutch is increased in small steps. Concurrently the transmission of torque by the clutch is controlled by means of the signals of the rotational speeds of the input shaft and the output shaft of the torque converter. If the transmission of torque exceeds a predetermined limit value the corresponding activating pressure of the clutch is taken as the pressure at the kiss-point of the clutch. The activating pressure of the clutch acting upon the clutch lies between an upper limit and a lower limit wherein the limits depend on the type of clutch used and on the type of transmission system used. These limits can be programmed as parameters in the control unit. If the transmission of torque correlating with the pressure at the kiss-point of the clutch is exceeded before the first step of the sequence of increasing the pressure has been performed, an error signal results. An error signal is also produced if the pressure at the kiss-point of the clutch is not yet determined but the maximum activating pressure of the clutch has been reached.

After determining the activating pressure of the clutch, in the next process the filling parameters of the clutch will be determined. The present invention provides for the iteration of a plurality of different parameters wherein the parameters determine the length and the course or signal of the filling phase 1 and the modulation phase 2 according to FIG. 1. In some cases of an implementation of the iteration process, the adaptation of a plurality of parameters could become too complex and could be too time-consuming. In order to solve these problems, two important parameters have been selected to define the filling phase 1 that at the same time effect the modulation phase. According to a preferred embodiment only these selected parameters will be determined in an iterative manner. The other parameters defining the length and the course or signal of the filling phase 1 and the modulation phase 2 will be set to fixed values correlating to common values used according to prior art for the specific clutches. For example, the activating pressure of the clutch in the modulation phase 2 is starting from the activating pressure of the clutch in the end of the filing phase 1, i.e. from the pressure in the stabilizing phase B, and increased approximately linearly to the maximum activating pressure according to FIG. 1.

The two selected parameters adapted in the implementation according to the invention in an iterative manner are the filling of the clutch during phase A of filling phase 1, shortly named "filling A", and the activating pressure of the clutch in the stabilizing phase B, shortly named "pressure B". The filling A corresponds to the area under the curve of the activating pressure of the clutch in the phase A which is a measure for the amount of fluid which is introduced into the clutch during phase A. The nominal value of filling A is specific for every type of clutch in every type of transmission system, i.e. depends on the chosen construction. For that reason for one population of transmission systems values determined by experiments for transmission systems of the same type will be used for filling A as a starting value, a default value or a fall-back-value.

The pressure B is the level of pressure which is set during the stabilizing phase B of filling phase 1. In order to achieve a good fall-back-value for such pressure B for each clutch the determination of the pressure correlating with the kiss-point of the clutch is performed. The fall-back-value and the start value of pressure B is in direct relation with the pressure correlating with the kiss-point of the clutch. The specific relation is determined by experiments for each type of clutch in every type of transmission system and is programmed as a parameter in the control unit.

The iterative adaptation consists of two separate loops. The first loop is used for an adaptation of pressure B, whereas the second loop is used for adaptation of the filling A. The main iteration of the pressure B is quite simple. The iteration starts with the starting value for pressure B which has been determined on the basis of the pressure correlating with the kiss-point of the clutch. The iteration then performs one complete iteration of the filling A (see below). Afterwards, the pressure B is adapted and once again a complete iteration of filling A is performed. The maximum number of iteration steps can be programmed by means of a parameter in the control unit. The step length for the adaptation of pressure B is one parameter which is dependent on the type of clutch and the type of transmission system used.

The basic iteration process is the adaptation of the filling A. For every engaging process during the iteration the time sequence of the engaging process and of the behavior of the output shaft of the torque converter during the engaging process is determined or measured. For an evaluation of a real engaging process the following single steps will be performed: Start the engaging process. Set the actual rotational speed of the output of the torque converter to 100%. Wait until the rotational speed of the output shaft of the torque converter drops under a percentage which is defined as the point at which the rotational speed of the output shaft interferes with the engaging process. This is one parameter which is programmed in the control unit and that is used as a reference point for the engaging process. At the moment of the rotational speed of the output shaft of the torque converter falling under this percentage of the starting value at the beginning of the engaging process the engaging process starts to influence the rotational speed of the output shaft of the torque converter. Under normal conditions this means that the force at the wheels of the vehicle is changed. This event is important for the evaluation of the engaging process and should occur (within a defined tolerance) at a given time. The given time is again a parameter which is dependent on the type of clutch and the type of transmission system used. The given time will be determined by experiments on the basis of a population of the same type of transmission system.

Afterwards it will be waited until the rotational speed of the output of the torque converter drops under a predetermined minimal percentage. The rotational speed of the output of the torque converter is sampled in short intervals, for example every $5^{th}$ millisecond, and the measured values of the rotational speeds are stored. The stored values of the rotational speed will be analyzed and will then be adapted to the desired ideal signal of the rotational speed of the output of the torque converter which can be done in different ways.

According to a preferred implementation of the new method the ideal signal of the rotational speed of the output shaft is determined under consideration of the stored values of the rotational speed. This is done by using for example a Gaussian curve or a simple linear curve and adapting such curve to the starting value of the rotational speed of the output of the torque converter and to the duration of the engaging process, i.e. a scaling takes place. In most cases a linear signal may be sufficient.

For every measurement value of the stored values of the rotational speed of the torque converter the deviation from the ideal signal is calculated. A rise of the rotational speed of the output of the torque converter during the engaging process is undesired. In order to punish a change of the direction of the change of the rotational speed the determined single values of the deviation will be multiplied with a factor which is proportional to the amount that the rotational speed has increased with respect to the previous measurement value. Afterwards the sum of these single deviations is calculated.

In order to consider the expected time sequence of the signals of the rotational speed the sum of the single deviations is multiplied with the expected time duration of the engaging process and afterwards divided by the square of the actually measured time interval. This is done in order to punish too fast changes of the rotational speed with a high value of the deviation. This is due to the fact that jumps of the rotational speed correspond to hard and non-smooth shifts. The square of the actually measured time interval is limited during this calculation by means of the square of the expected time interval as a lower limit.

The time sequence of the decrease of the rotational speed indicates that the engaging process is started. This is an important part of the evaluation. In case that this event does not occur within a predetermined accepted time interval, consequently no value of the deviation is calculated. This is due to the fact that any calculated value would be incorrect. Instead the engaging process is described by a very high value of the deviation.

Every time the value of the deviation of the performed engaging process becomes better, i.e. the deviation is smaller than the best of the preceding values, this new value is the competitive reference. The pre-attunable maximum number of attempts to compete this value will be reset. Afterwards, a new engagement process is started. The described iteration will be performed, until the best (lowest) value of the deviation cannot be improved by adaptation of filling A within a given maximum number of attempts. Then the iteration will be stopped and the corresponding value of filling A and the corresponding value of pressure B are stored. At this point the main iteration checks if a new iteration of an adapted value of pressure B has to be performed, wherein the iteration of filling A is performed with the adapted value of pressure B.

Finally, the aforementioned process yields a matrix of a plurality of best parameters for the engaging process. Now the parameters for the engaging are searched that correlate with the smallest value of the deviation. These parameters will be durably stored in the control unit. The whole process requires approximately 2 minutes for each search. The value is the mean value for one population of one adapted type of transmission systems.

The described iteration process can be used for any type of clutch and transmission system. In order to adapt the process to the respective combination of a clutch and a transmission system several of the aforementioned parameters have to be entered into the control unit. These include the time sequence of the engaging process after its start and the acceptable tolerance; the precision of the adaptation which is used for the filling parameters in each step, in particular the step size; a delay before the performance of every next iteration step; the sensibility for the determination of the effects of the engaging process on the rotational speed of the output shaft of the torque converter; the slope of the modulation which is used for every iteration step during the performed engaging process, and the evaluation criteria used for associating a value as a measure for the deviation from a desired engaging process to an actual engaging process.

Many variations and modifications may be made to the preferred embodiments of the invention without departing substantially from the spirit and principles of the invention. All such modifications and variations are intended to be included herein within the scope of the present invention, as defined by the following claims.

We claim:

1. A method for adaptation of an engagement of an automated clutch, the clutch being arranged in a transmission system of a vehicle downstream of a torque converter, said method comprising the steps of
operating the clutch by an actuating pressure during an engaging process of the clutch;
controlling said actuating pressure over time such that predetermined characteristics for the engagement of said clutch are approximated by
starting a process for changing a rotational speed of an output shaft of the torque converter for an adaptation of a rotational speed to an actual velocity of the vehicle during engagement of the clutch,
determining an ideal signal for the rotational speed of the output shaft over time wherein the ideal signal corresponds to an estimate for the engagement of the clutch with the predetermined characteristics,
measuring an actual signal of the rotational speed of the output shaft over time during said process,
determining deviations between the actual signal and the ideal signal,
automatically changing a signal of the actuating pressure over time in order to reduce the deviations between the actual signal and the ideal signal if the deviations exceed a threshold.

2. The method of claim 1, wherein the process is started for the engagement of the clutch for running engine, resting vehicle and blocked wheels.

3. The method of claim 1, wherein during said process a rotational speed of an input shaft of the torque converter is controlled to be approximately constant.

4. The method of claim 1, wherein the ideal signal of the rotational speed of the output shaft over time is determined by means of at least one mathematical function.

5. The method of claim 4, wherein the ideal signal of the rotational speed of the output shaft over time is determined by means of a Gaussian function.

6. The method of claim 1, wherein during said process the ideal signal of the rotational speed of the output shaft over time is rescaled to correspond to an actual absolute change of speed prior to determining said deviations.

7. The method of claim 1, wherein
said step of determining the deviations uses a method of square distances of the actual signal and the ideal signal and
said step of automatically changing the signal of the actuating pressure over time includes changing the signal such that the square distance of the actual signal and the ideal signal is minimized.

8. The method of claim 1, wherein
after said step of automatically changing the signal of the actuating pressure over time said process is repeated,
the actual signal of the rotational speed of said output shaft over time is measured during said step of repeating said process and compared with the ideal signal, the signal of the actuating pressure over time is automatically changed such that the deviations are further reduced if the deviations between said actual signal and said ideal signal during the repeated process again exceed a predetermined threshold;

said process is again repeated until predetermined deviations no longer exceed the threshold.

9. The method of claim 1, wherein the changed signal of the actuating pressure over time is stored and used for future engagements of the clutch until a step of repeating the adaptation is performed.

10. The method of claim 1, wherein a step of adaptation is performed for each clutch of the transmission system of the vehicle.

11. A system for adaptation of an engagement of an automated clutch, said clutch being arranged downstream of a torque converter in a transmission system of a vehicle, comprising:

a storing device for storing a signal of an actuating pressure of said clutch over time;

a control unit designed and arranged for changing said signal of said actuating pressure over time such that predetermined characteristics for the engagement of said clutch are approximated, said control unit being designed and arranged for starting a process during engagement of said clutch for changing the rotational speed of an output shaft of said torque converter to adapt the rotational speed to the actual speed of the vehicle;

a storing device for storing an ideal signal of the rotational speed of said output shaft over time, wherein the ideal signal corresponds to an estimate for an engagement of said clutch with predetermined characteristics;

a measuring device for measuring an actual signal of the rotational speed of said output shaft over time during said process; wherein said control unit is designed and arranged for determining deviations between the actual signal of the rotational speed of the output shaft over time and the ideal signal, said control unit is designed and arranged for an examination if the deviations exceed a threshold, said control unit is designed and arranged to automatically change the signal of the actuating pressure over time if said control unit is aware that the deviations exceed the threshold.

12. The system of claim 11, wherein said control unit is designed and arranged to check if the engine of the vehicle is running, the vehicle rests and wheels of the vehicle are blocked and to start the process only if the vehicle is running, the vehicle rests and the wheels are blocked.

13. The system of claim 11, wherein said control unit is designed and arranged to control the rotational speed of said input shaft of said torque converter to be approximately constant when the process is running.

14. The system of claim 11, wherein said storing decive is designed and arranged to store at least one mathematical function correlating with the ideal signal.

15. The system of claim 14, wherein said storing device is designed and arranged to store at least one Gaussian function correlating with the ideal signal.

16. The system of claim 11, wherein said control unit is designed and arranged to rescale the ideal signal during the process to an actual absolute change of the rotational speed.

17. The system of claim 11, wherein said control unit is designed and arranged to determine the deviations between the ideal signal and the actual signal by means of a method of square distances of the signals and change the signal of the actuating pressure over time in order to minimize the square distance of the signals.

18. The system of claim 11, wherein said control unit is designed and arranged for repeating the process after automatically changing the signal of the actuating pressure;

said measuring device is designed and arranged for measuring the actual signal of the rotational speed of said output shaft over time during said repeated process;

said control unit is designed and arranged for comparing said actual signal and said ideal signal during said repeated process;

said control unit is designed and arranged for again automatically changing the signal of the actuating pressure over time if the deviations between the actual signal and the ideal signal during the repeated process exceed the threshold;

said control unit is designed and arranged to finish repeating the process if the deviations no longer exceed the threshold.

19. The system of claim 11, wherein said storing device is designed and arranged to store the signal for engaging said clutch until another process is started.

20. The system of claim 11, wherein said storing device comprises separate storing units for each clutch of said transmission system of said vehicle.

* * * * *

UNITED STATES PATENT AND TRADEMARK OFFICE
CERTIFICATE OF CORRECTION

PATENT NO.    : 6,971,971 B2
DATED         : December 6, 2005
INVENTOR(S)   : Ivana Duskunovic, Dries T'Hooft and Kris Vanstechelman It is certified that error appears in the above-identified patent and that said Letters Patent is hereby corrected as shown below:

<u>Column 14,</u>
Line 7, replace "decive" with -- device --.

Signed and Sealed this

Fourth Day of April, 2006

JON W. DUDAS
*Director of the United States Patent and Trademark Office*